United States Patent
Hata

(10) Patent No.: US 11,616,907 B2
(45) Date of Patent: Mar. 28, 2023

(54) IMAGE CAPTURING APPARATUS, IMAGE CAPTURING SYSTEM, CONTROL METHOD THEREFOR, AND STORAGE MEDIUM

(71) Applicant: CANON KABUSHIKI KAISHA, Tokyo (JP)

(72) Inventor: Tetsuya Hata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/157,798

(22) Filed: Jan. 25, 2021

(65) Prior Publication Data

US 2021/0243365 A1 Aug. 5, 2021

(30) Foreign Application Priority Data

Jan. 31, 2020 (JP) .............................. JP2020-015534

(51) Int. Cl.
*H04N 5/232* (2006.01)
*H04N 5/262* (2006.01)
*H04N 5/225* (2006.01)

(52) U.S. Cl.
CPC ......... *H04N 5/23229* (2013.01); *H04N 5/262* (2013.01); *H04N 5/2251* (2013.01)

(58) Field of Classification Search
CPC .......... H04N 5/23222; H04N 5/23206; H04N 5/23229; H04N 1/00127; H04N 1/00167; H04N 1/00172; H04N 1/00185; H04N 1/00204; H04N 2101/00; H04N 5/23203; H04N 5/23219; H04N 1/21; G06T 3/40; G06V 40/10; G06V 20/52; G06V 40/173
See application file for complete search history.

(56) References Cited

U.S. PATENT DOCUMENTS

| | | | |
|---|---|---|---|
| 8,797,415 B2* | 8/2014 | Arnold | H04N 5/243 348/211.99 |
| 2009/0163185 A1* | 6/2009 | Lim | H04N 19/164 382/284 |
| 2016/0142625 A1* | 5/2016 | Weksler | H04N 5/23206 348/222.1 |
| 2020/0098099 A1* | 3/2020 | Miyamori | G06T 5/50 |

FOREIGN PATENT DOCUMENTS

JP 2007-116291 A 5/2007
WO 2019/141074 A1 7/2019

* cited by examiner

*Primary Examiner* — Hung H Lam
(74) *Attorney, Agent, or Firm* — Canon U.S.A., Inc. IP Division

(57) ABSTRACT

An image capturing apparatus comprises an image sensing unit including an image sensor and configured to capture an image by photoelectric converting an optical image formed on an imaging surface and output an image signal, and a setting unit configured to set shooting parameters to be used at a time of capturing the image by the image sensing unit. The setting unit sets different shooting parameters to be used at the time of capturing the image by the image sensing unit between in a case where it is possible to perform image processing on the image signal by an external image processing apparatus and in a case where it is not possible to perform image processing on the image signal by the external image processing apparatus.

12 Claims, 9 Drawing Sheets

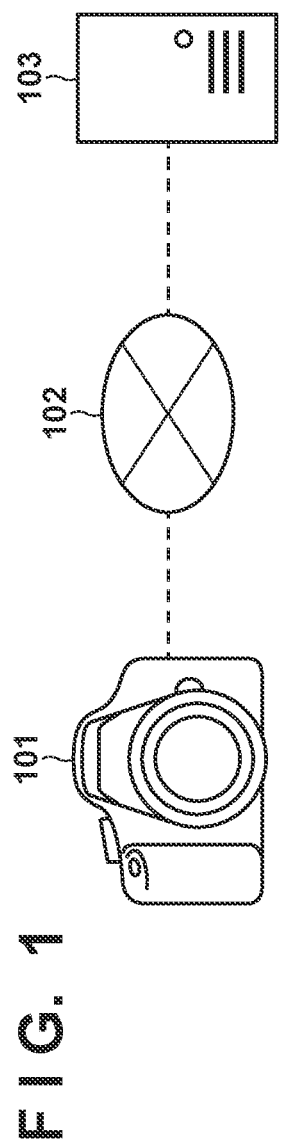
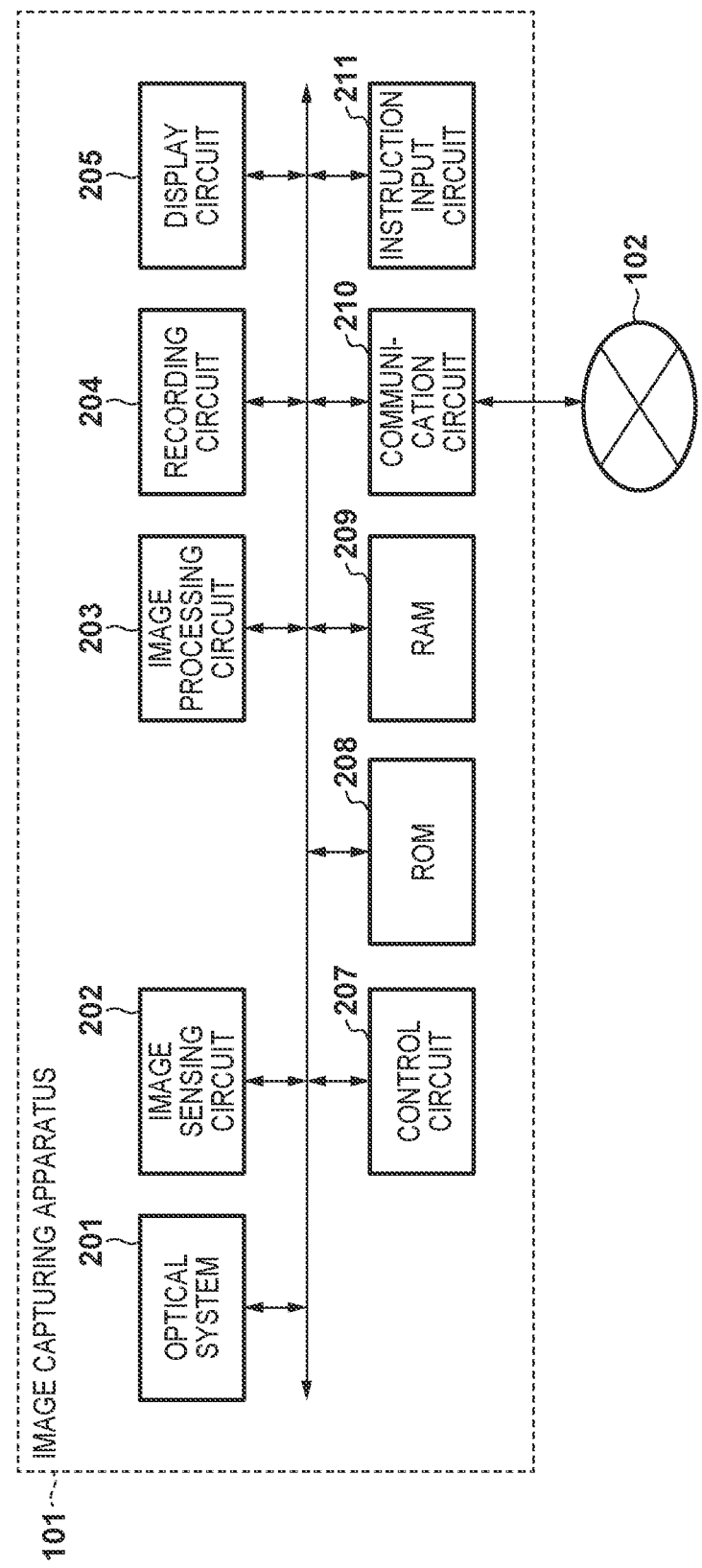

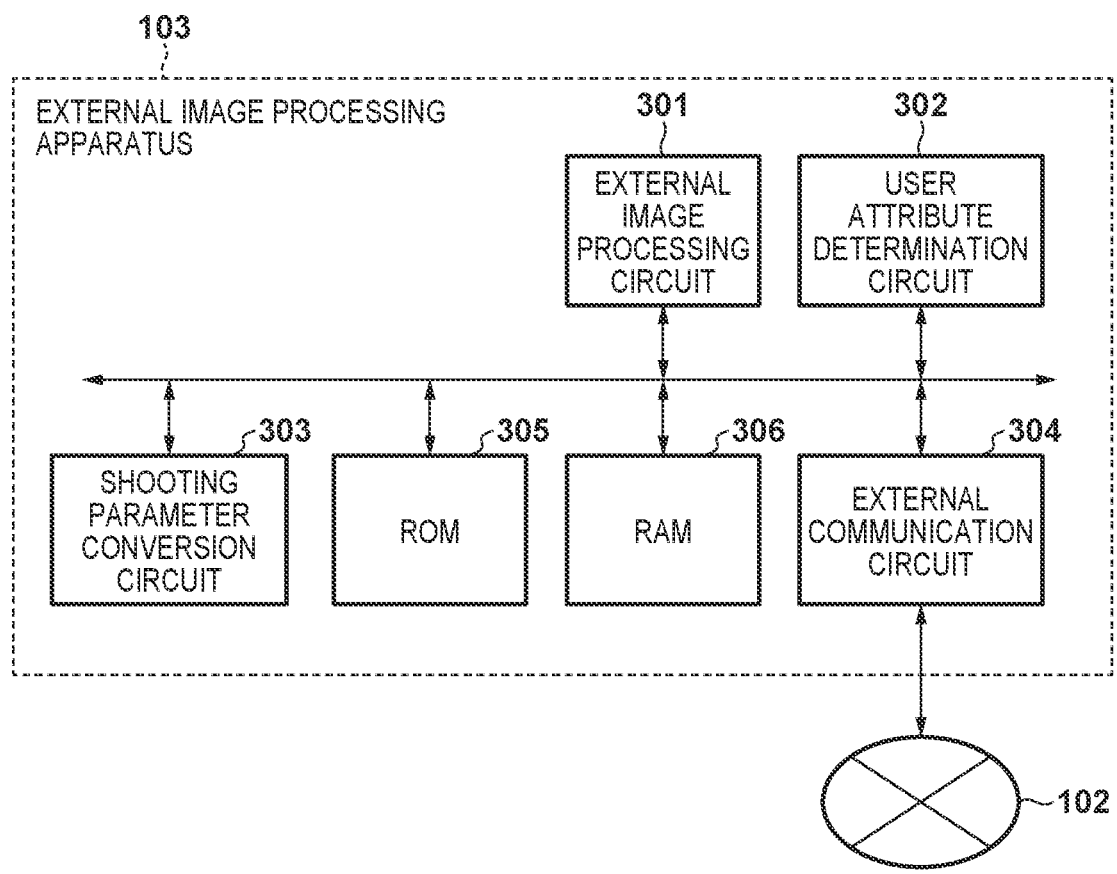

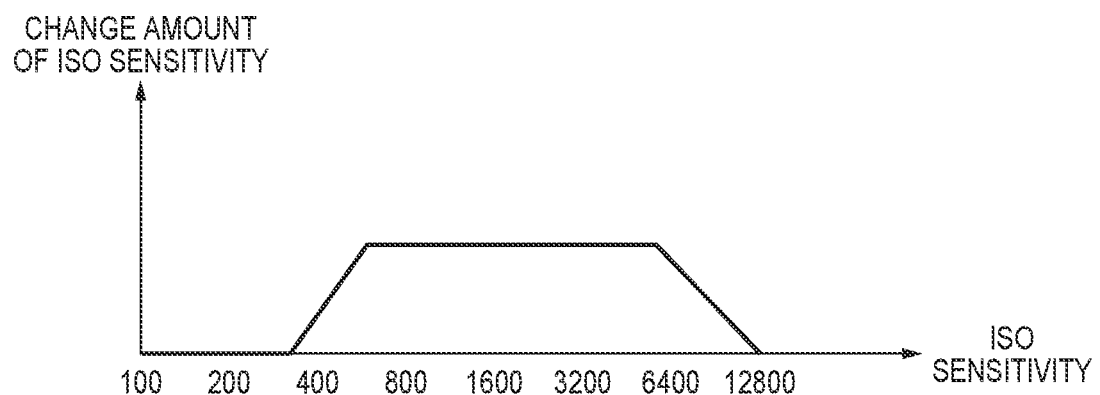

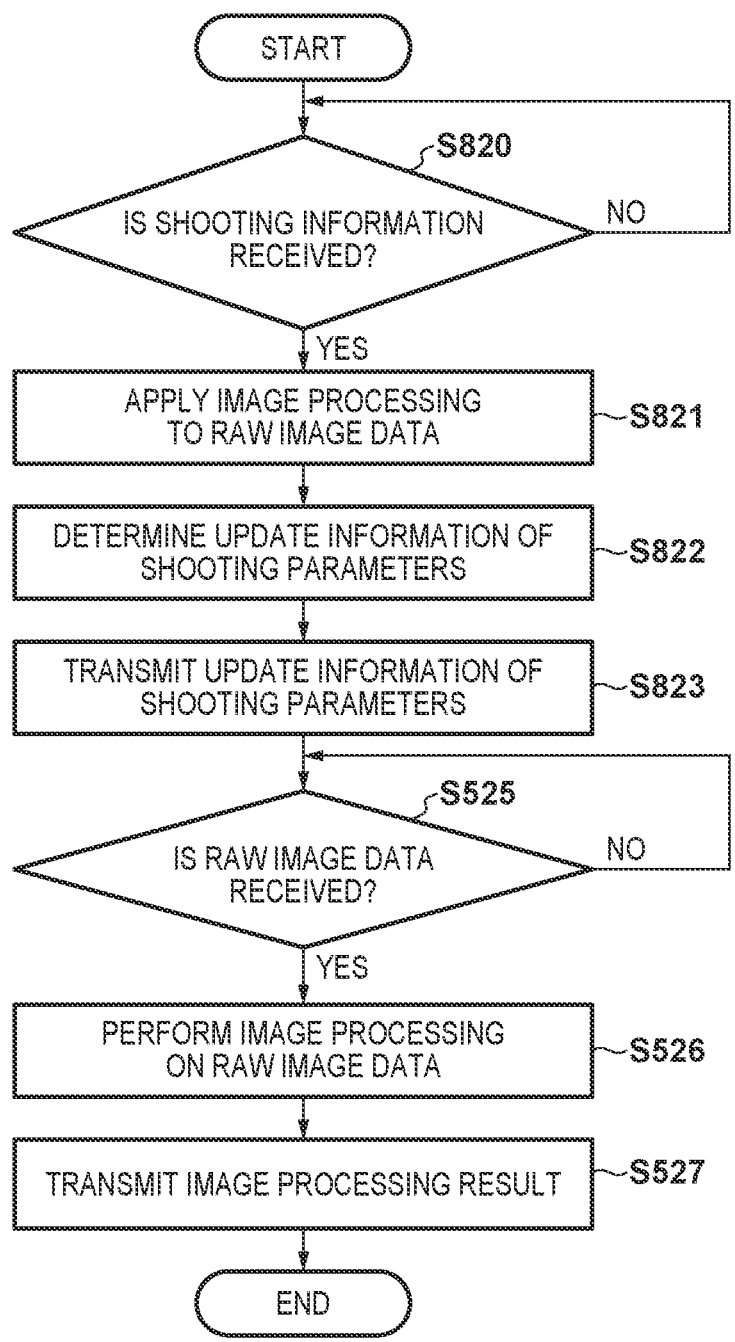

IMAGE CAPTURING APPARATUS, IMAGE CAPTURING SYSTEM, CONTROL METHOD THEREFOR, AND STORAGE MEDIUM

BACKGROUND

Field of the Disclosure

The present disclosure relates to an image capturing apparatus, image capturing system, control method therefor, and storage medium and specifically, to a technique for performing image processing using an image processing apparatus outside of the image capturing apparatus.

Description of the Related Art

Conventionally, image processing such as NR processing for removing noise components is applied to an image captured by an image capturing apparatus, so that the image is corrected to become a high-quality image. In order to obtain a high-quality image using NR processing, it is necessary to determine shooting parameters such as an aperture value, shutter speed, and ISO sensitivity at the time of shooting, taking into consideration the noise reduction effect of NR processing. For example, increasing the ISO sensitivity increases the intensity of the noise component, but it is possible to increase the shutter speed, so that the effects of camera shake and subject shake are reduced. Therefore, when shooting a moving subject in a dark environment, it is desired to increase the ISO sensitivity within an acceptable range of the intensity of the noise component after NR processing is performed and determine shooting parameters such as shutter speed and aperture value.

Further, there are cases where the image processing for a captured image is performed not in the image capturing apparatus but in the image processing apparatus outside the image capturing apparatus. For example, Japanese Patent Laid-Open No. 2007-116291 discloses a technique that an image captured by an image capturing apparatus and model information of the image capturing apparatus are transferred to an external image processing apparatus, and the external image processing apparatus performs image quality correction on the transferred image based on image quality correction parameters recorded for each model of the image capturing apparatus.

In addition, in recent years, with the development of advanced image processing technology using statistical feature amounts and the like, advanced image processing that is difficult to perform in an image capturing apparatus is executed by an image processing apparatus outside the image capturing apparatus. This makes it possible to obtain higher quality images. In this case, it is necessary to determine the shooting parameters at the time of shooting in consideration of the result of image processing (for example, the degree of noise reduction) by the external image processing apparatus.

However, in the conventional technique, it has not been possible to separately determine the optimum shooting parameters suitable for cases where the image processing is performed within an image capturing apparatus and suitable for cases where the image processing is performed in an image processing apparatus outside the image capturing apparatus.

SUMMARY

The present disclosure has been made in consideration of the above situation, and determines shooting parameters corresponding to the image processing and suitable for shooting scenes.

According to embodiments of the present disclosure, provided is an image capturing apparatus comprising: an image sensing unit including an image sensor and configured to capture an image by photoelectric converting an optical image formed on an imaging surface and output an image signal; and a setting unit configured to set shooting parameters to be used at a time of capturing the image by the image sensing unit, wherein the setting unit sets different shooting parameters to be used at the time of capturing the image by the image sensing unit between in a case where it is possible to perform image processing on the image signal by an external image processing apparatus and in a case where it is not possible to perform image processing on the image signal by the external image processing apparatus, and wherein the setting unit is implemented by at least one or more processors.

Further, according to embodiments of the present disclosure, provided is an image capturing system comprising an image capturing apparatus and an image processing apparatus, wherein: the image capturing apparatus includes: an image sensing unit including an image sensor and configured to capture an image by photoelectric converting an optical image formed on an imaging surface and output an image signal; a first image processing unit configured to perform image processing on the image signal; a first determination unit configured to determine shooting parameters, corresponding to the image processing by the first image processing unit, to be used at a time of capturing the image by the image sensing unit; and a first communication unit configured to perform transmission and reception of information with the image processing apparatus, wherein the first image processing unit, the first determination unit, and the first communication unit are implemented by first one or more processors, and the image processing apparatus includes: a second communication unit configured to perform transmission and reception of information with the image capturing apparatus; a second image processing unit configured to perform image processing on an image signal received from outside; and a second determination unit configured to determine a change amount of at least one of the shooting parameters, corresponding to the image processing by the second image processing unit based on information received from the image capturing apparatus, wherein the second communication unit, the second image processing unit, and the second determination unit are implemented by second one or more processors.

Furthermore, according to embodiments of the present disclosure, provided is a control method of an image capturing apparatus, the control method comprising: capturing an image by photoelectric converting an optical image formed on an imaging surface and outputting an image signal; and setting shooting parameters to be used at a time of capturing the image, wherein different shooting parameters to be used at the time of capturing the image are set between in a case where it is possible to perform image processing on the image signal by an external image processing apparatus and in a case where it is not possible to perform image processing on the image signal by the external image processing apparatus.

Further, according to embodiments of the present disclosure, provided is a control method of an image capturing system that includes an image capturing apparatus and an image processing apparatus, the image capturing apparatus configured to capture an image by photoelectric converting an optical image formed on an imaging surface, output an image signal, and perform image processing on the image signal, the image processing apparatus configured to perform image processing on an image signal received from outside, the control method comprising: determining shooting parameters, corresponding to the image processing by the image capturing apparatus, to be used at a time of capturing an image in the image capturing apparatus; and determining a change amount of at least one of the shooting parameters, corresponding to the image processing by the image processing apparatus based on information received from the image capturing apparatus.

Further, according to embodiments of the present disclosure, provided is a non-transitory computer-readable storage medium storing a program that is executable by a computer, wherein the program includes program code for causing the computer to perform a control method of an image capturing apparatus, the control method comprising: capturing an image by photoelectric converting an optical image formed on an imaging surface and outputting an image signal; and setting shooting parameters to be used at a time of capturing the image, wherein different shooting parameters to be used at the time of capturing the image are set between in a case where it is possible to perform image processing on the image signal by an external image processing apparatus and in a case where it is not possible to perform image processing on the image signal by the external image processing apparatus.

Further, according to embodiments of the present disclosure, provided is a non-transitory computer-readable storage medium storing a program that is executable by a computer, wherein the program includes program code for causing the computer to perform a control method of an image capturing system that includes an image capturing apparatus and an image processing apparatus, the image capturing apparatus configured to capture an image by photoelectric converting an optical image formed on an imaging surface, output an image signal, and perform image processing on the image signal, the image processing apparatus configured to perform image processing on an image signal received from outside, the control method comprising: determining shooting parameters, corresponding to the image processing by the image capturing apparatus, to be used at a time of capturing an image in the image capturing apparatus; and determining a change amount of at least one of the shooting parameters, corresponding to the image processing by the image processing apparatus based on information received from the image capturing apparatus.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

FIG. 1 is a diagram showing a configuration of an image capturing system according to an embodiment of the present disclosure;

FIG. 2 is a block diagram showing a functional configuration of an image capturing apparatus according to the embodiment;

FIG. 3 is a diagram showing a functional configuration of an external image processing apparatus according to the embodiment;

FIG. 4 is a diagram showing an example of a user attribute information table according to the embodiment;

FIG. 7 is a diagram showing an example of change amounts of a shooting parameter according to the first embodiment;

FIG. 8B is a flowchart showing processing of the external image processing apparatus according to the second embodiment.

DESCRIPTION OF THE EMBODIMENTS

Figure 5A:
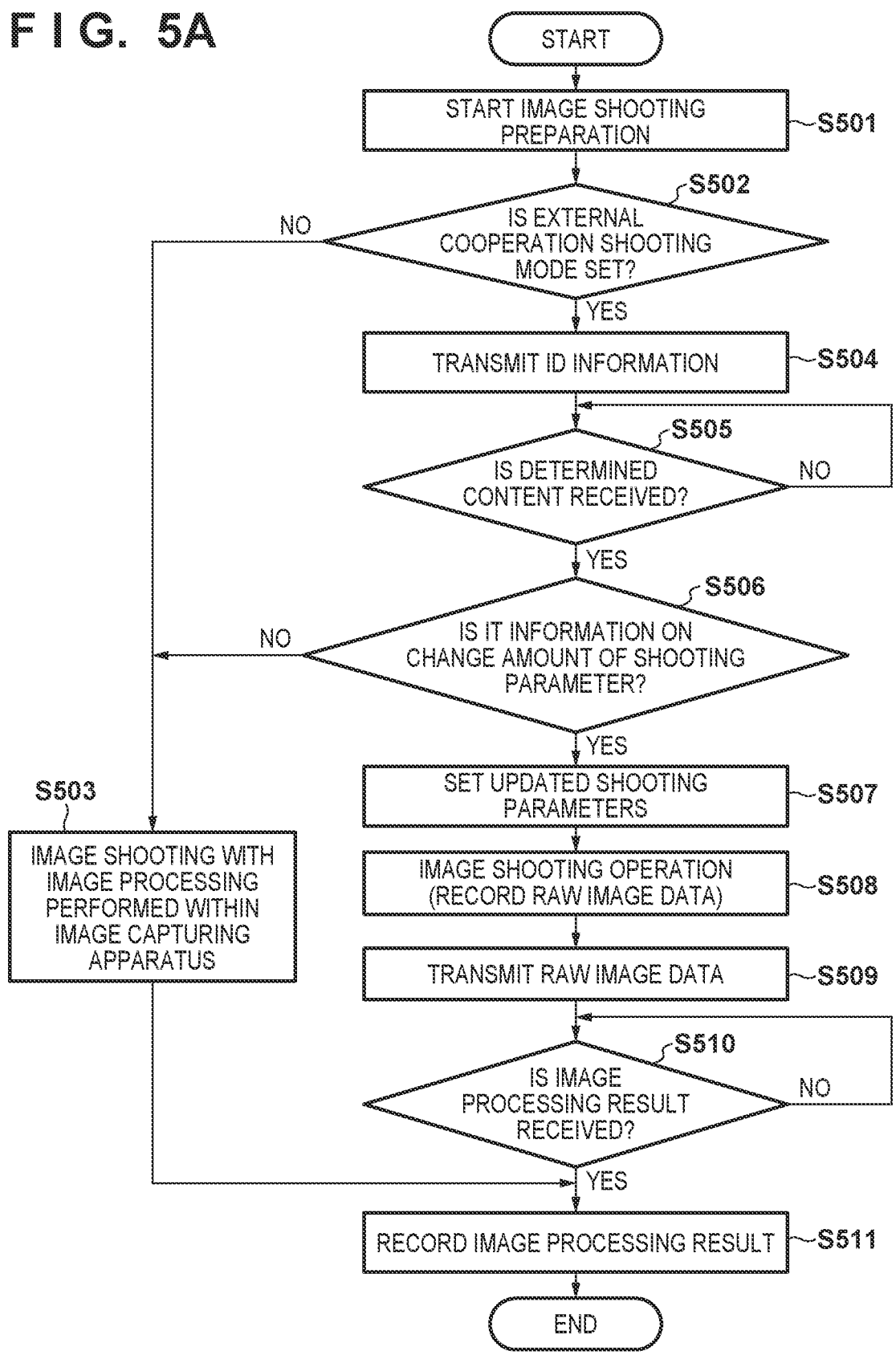
FIG. 5A is a flowchart showing processing of the image capturing apparatus according to a first embodiment.

Hereinafter, embodiments will be described in detail with reference to the attached drawings. Note, the following embodiments are not intended to limit the scope of the disclosure, and embodiments of the disclosure do not require a combination of all features described. Two or more of the multiple features described in the embodiments may be combined as appropriate. Furthermore, the same reference numerals are given to the same or similar configurations, and redundant description thereof is omitted.

First Embodiment

A first embodiment of the present disclosure will be described.

In the first embodiment of the present disclosure, an image capturing system that controls shooting parameters in an image capturing apparatus based on user attribute information on an external image processing apparatus will be described.

FIG. 1 is a diagram showing a configuration example of an image capturing system including an image capturing apparatus according to a first embodiment of the present disclosure.

The image capturing system includes an image capturing apparatus 101 for capturing an image, a communication network 102, and an external image processing apparatus 103 comprised of a server and the like. The image capturing apparatus 101 can communicate with the external image processing apparatus 103 via the network 102.

Next, the functional configuration of the image capturing apparatus 101 will be described with reference to FIG. 2.

An optical system 201 is composed of a lens group including a zoom lens and a focus lens, and forms a subject image on the imaging surface of an image sensing circuit 202. The optical system 201 is provided with operation members (not shown) which are directly operated by a user to control the zoom position and focus position of the optical system 201.

The image sensing circuit 202 is, for example, an image sensor such as a CCD or a CMOS sensor, and photoelectrically converts an optical image formed on the imaging surface of the image sensing circuit 202 by the optical system 201. The obtained analog image signal is converted into digital image data by an A/D conversion circuit (not shown), and the image sensing circuit 202 outputs the digital image data as RAW image data. The RAW image data output from the image sensing circuit 202 is temporarily stored in a RAM 209.

An image processing circuit 203 applies various image processing such as white balance adjustment, color interpolation, gamma processing, and NR processing to the RAW image data stored in the RAM 209, and a resultant image of the image processing (for example, a JPEG image) is generated.

A control circuit 207 is, for example, a CPU, and reads a control program for each block included in the image capturing apparatus 101 from a ROM 208, loads the control program into the RAM 209, and executes the control program. In this way, the control circuit 207 controls the operation of each block included in the image capturing apparatus 101. For example, based on the luminance information of a shooting scene and an EV chart described later, shooting parameters such as an aperture value of the optical system 201, shutter speed of the image sensing circuit 202, and ISO sensitivity are determined, and the operation of each block is controlled. Further, as will be described later, the control circuit 207 determines the shooting parameters by further using update information of the shooting parameters transmitted from the external image processing apparatus 103.

The ROM 208 is an electrically erasable/recordable non-volatile memory, and stores an operation program for each block included in the image capturing apparatus 101, as well as parameters required for the operation of each block. Also, as will be described later, user ID information regarding the use of an external image processing apparatus is recorded.

The RAM 209 is a rewritable volatile memory, and is used for loading programs executed by the control circuit 207, etc., and temporarily storing data generated through the operation of each block provided in the image capturing apparatus 101, and so forth.

A recording circuit 204 is a removable memory card or the like. The recording circuit 204 records image data processed by the image processing circuit 203 via the RAM 209.

A display circuit 205 is a display device such as an LCD, and displays an image stored in the RAM 209, an image recorded in the recording circuit 204, an operation user interface for receiving an instruction from the user, and so forth.

An instruction input circuit 211 includes a touch panel and an operation buttons, and receives an instruction from the user. Further, the instruction input circuit 211 includes a shutter button (not shown), and the user can give an instruction for shooting by turning on a switch SW1 by half-pressing the shutter button, for example, and by turning on a switch SW2 by fully pressing the shutter button, for example.

A communication circuit 210 performs communication with the external image processing apparatus 103 via the network 102, and transmits, for example, ID information representing a user attribute related to the use of the external image processing apparatus 103, which will be described later, and RAW image data recorded on the recording circuit 204 to the external image processing apparatus 103. Further, as will be described later, the communication circuit 210 receives information regarding the amount of change with respect to the shooting parameters from the external image processing apparatus 103.

Next, the functional configuration of the external image processing apparatus 103 will be described with reference to a block diagram shown in FIG. 3.

An external image processing circuit 301 applies various image processing such as white balance adjustment, color interpolation, gamma processing, and NR processing to the input RAW image data. It is assumed that at least a part of the image processing applied here is performed by using an algorithm different from the image processing applied in the image processing circuit 203 of the image capturing apparatus 101. In the present embodiment, as an example, it will be explained that the algorithm of the NR processing is different from the algorithm used in the image processing circuit 203, and algorithms and contents of the other image processing are common to the image capturing apparatus 101 and the external image processing apparatus 103. Further, it will be described that a greater noise reduction effect can be achieved by the NR processing performed in the external image processing apparatus 103 than the NR processing performed in the image capturing apparatus 101.

A user attribute determination circuit 302 determines a user attribute by referring to the user attribute information for the use of the external image processing apparatus 103 recorded in advance in association with ID information with respect to input ID information.

A shooting parameter conversion circuit 303 determines a change amount of the shooting parameter in the image capturing apparatus 101 based on the user attribute information determined by the user attribute determination circuit 302.

An external communication circuit 304 communicates with the image capturing apparatus 101 via the network 102, and receives, for example, RAW image data and ID information from the image capturing apparatus 101. In addition, the external communication circuit 304 transmits information on shooting parameters determined by the shooting parameter conversion circuit 303 or the like to the image capturing apparatus 101.

A ROM 305 is an electrically erasable/recordable non-volatile memory, and stores an operation program for each block included in the external image processing apparatus 103, as well as parameters required for the operation of each block. Further, in the ROM 305, the user attribute information regarding the use of the external image processing apparatus 103 is recorded in association with the ID information.

A RAM 306 is a rewritable volatile memory, and is used for loading a program executed by each part of the external image processing apparatus 103, temporarily storing the generated data, and the like.

Next, an example of the user attribute information recorded in the external image processing apparatus 103 will be described with reference to FIG. 4. In a user attribute information table 401, a column 402 represents ID information of each user, and a column 403 represents information showing authorization to use image processing in the external image processing circuit 301. For example, if user registration is required prior to use image processing in the external image processing circuit 301, information on whether or not each user has performed user registration in advance is recorded.

Figure 5B:
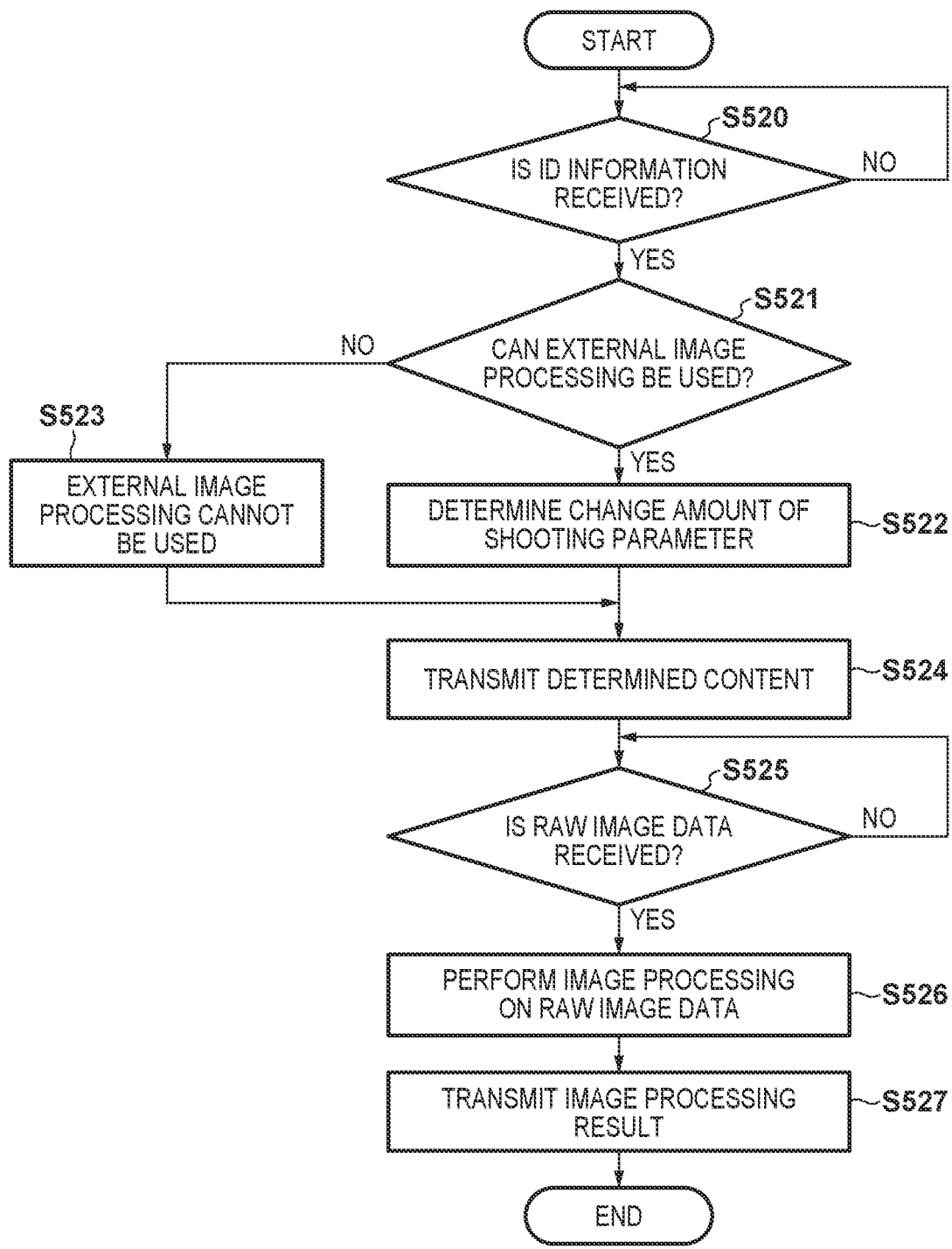
FIG. 5B is a flowchart showing processing of the external image processing apparatus according to the first embodiment.

Next, the operation of the image capturing system in the first embodiment will be described with reference to the flowcharts of FIGS. 5A and 5B. FIG. 5A shows the processing in the image capturing apparatus 101, and FIG. 5B shows the processing in the external image processing apparatus 103.

First, in step S501, the image capturing apparatus 101 starts normal image shooting preparation. Specifically, when the user turns on the image capturing apparatus 101, the control circuit 207 of the image capturing apparatus 101 acquires the brightness information of the shooting scene and determines the shooting parameters. In this embodiment, the case where the Av priority mode in which the user specifies and sets the aperture value (Av value) is selected will be described as an example.

The method of determining the shooting parameters performed here, particularly the method of determining ISO sensitivity, shutter speed, and aperture value will be described with reference to the Ev chart shown in FIG. 6.

Figure 6:
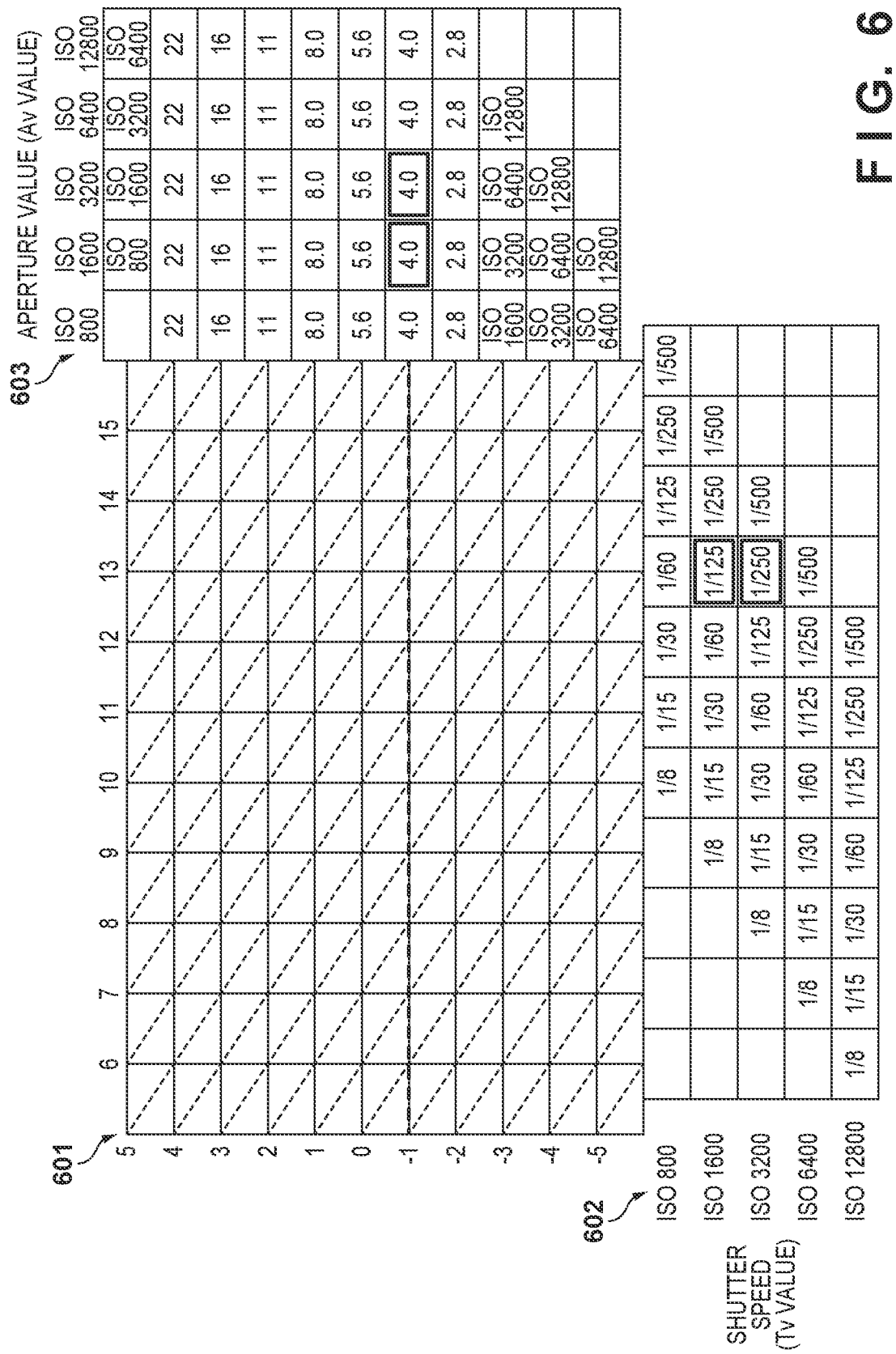
FIG. 6 is a diagram showing an example of an EV chart according to the first embodiment.

In FIG. 6, a reference numeral 601 represents the luminance information (By value) of the shooting scene. A reference numeral 602 represents the shutter speed (Tv value), and Tv values used when the ISO sensitivity ranges from 800 to 12800 are shown. A reference numeral 603 represents the aperture value (Av value), and Av values used when the ISO sensitivity ranges from 800 to 12800 are shown.

When the ISO sensitivity is set to auto, the ISO sensitivity value which is predetermined by the designer for each By value based on the noise characteristics at each sensitivity and the prediction of the noise reduction effect after applying the NR processing is used. Here, a case where the Av value set by the user is 4.0 and the By value calculated by the control circuit 207 is 7 will be described as an example. Further, under the above conditions, it is assumed that the ISO sensitivity at the time of auto is designed in advance as 1600. In this case, the Tv value of $1/125$ is determined as a shooting parameter. To sum up, the ISO sensitivity is 1600, the Tv value is $1/125$, and the Av value is 4.0.

Regarding the ISO sensitivity setting when the ISO sensitivity is set to auto, increasing the ISO sensitivity and increasing the Tv value have the advantage of reducing the effects of camera shake and motion blur of the subject, but on the other hand, have the disadvantage of increasing image noise. For this trade-off, it is advisable to design the Ev chart so that the Tv value is set to be as fast as possible within the allowable range of the noise level in consideration of the noise reduction effect of the NR processing.

In step S502, it is determined whether or not an external cooperation shooting mode, which is a shooting mode that includes image processing by the external image processing apparatus 103, is set by the user. If such mode is not set, the process proceeds to step S503 and a normal image shooting operation is performed. In step S503, an image is captured according to a user's shooting instruction as a normal image shooting operation. Here, after performing image shooting operation to capture RAW image data, a series of image processing is executed by the image processing circuit 203 and the process proceeds to step S511.

On the other hand, if the external cooperation shooting mode is set, the process proceeds to step S504, and a series of image shooting operation that uses image processing by the external image processing apparatus 103 is started. In step S504, ID information regarding the use of the external image processing apparatus 103 is transmitted from the communication circuit 210 of the image capturing apparatus 101 to the external image processing apparatus 103 via the network 102, and the process proceeds to step S505.

In the external image processing apparatus 103, the ID information is waited in step S520, and when the ID information is received, the process proceeds to step S521. In step S521, the user attribute determination circuit 302 determines whether or not the image processing in the external image processing apparatus 103 can be used by referring to the table shown in FIG. 4 with the received ID information used as a key. If the user attribute information indicates affirmative, the process proceeds to step S522 to acquire information indicating a change amount of the shooting parameter in the image capturing apparatus 101. If it the user attribute information indicates negative, the process proceeds to step S523.

The change amounts of the shooting parameters are determined and stored in advance based on the difference in characteristics between the image processing in the image capturing apparatus 101 and the image processing in the external image processing circuit 301. FIG. 7 shows an example of the change amounts of a shooting parameter.

The horizontal axis of the graph in FIG. 7 represents choices of the ISO sensitivity determined by the image capturing apparatus 101 in a normal image shooting operation. The vertical axis indicates the change amount of the ISO sensitivity in the external cooperation shooting mode, and shows that the shooting parameter is updated in the direction of increasing the ISO sensitivity by a predetermined amount at the time of high sensitivity than at the time of normal sensitivity. It means that, in the image shooting mode which uses the NR processing in the external image processing circuit 301, it is controlled so that the image shooting is performed with higher ISO sensitivity than usual. By this change, the shutter speed (Tv value) can be set faster by the amount that the ISO sensitivity is increased, and the influence of camera shake and motion blur of the subject can be suppressed.

On the other hand, in step S523, since the image processing in the external image processing apparatus 103 cannot be used, it is determined to transmit that the image processing in the external image processing apparatus 103 cannot be used.

In step S524, the information on the change amount of the shooting parameter shown in FIG. 7 determined in step S522 or the fact that the image processing in the external image processing apparatus 103 is not available which is determined in step S523 is transmitted to the camera via the network 102.

The image capturing apparatus 101 waits in step S505 until it receives the information on the change amount of the shooting parameter or the fact that the image processing in the external image processing apparatus 103 cannot be used. Then, in step S506, when the received content is not information on the change amount of the shooting parameter, that is, in a case where the image processing in the external image processing apparatus 103 cannot be used, the process proceeds to step S503 to perform a normal image shooting operation.

On the other hand, if the received content is information on the change amount of the shooting parameter, the process proceeds to step S507, and the shooting parameters are updated based on the received information. For example, in the Ev chart shown in FIG. 6, when the shutter speed (Tv value) selected in the normal image shooting operation is the Tv value $1/125$, the Tv value $1/250$, which is a value when the ISO sensitivity is increased by one step, is newly selected. That is, the shooting parameters in the normal image shooting operation are ISO sensitivity 1600, Tv value $1/125$, and Av value 4.0, whereas the shooting parameters in the external cooperation shooting mode are ISO sensitivity 3200, Tv value $1/250$, and Av value 4.0.

In step S508, the image capturing apparatus 101 captures an image using the updated shooting parameters. Here, the processes up to which the RAW image data output from the image sensing circuit 202 is recorded in the recording circuit 204 are performed.

Next, in step S509, the image capturing apparatus 101 transmits the recorded RAW image data to the external image processing apparatus 103 via the network 102.

The external image processing apparatus 103 waits until the RAW image data is received from the image capturing apparatus 101 in step S525, and when the RAW image data is received, in step S526, the received RAW image data undergoes image processing by the external image processing circuit 301, and image data is generated.

In step S527, the external image processing apparatus 103 transmits the generated image data to the image capturing apparatus 101 via the network 102. Note that the external image processing apparatus 103 may record the generated image data on a recording medium (not shown) instead of transmitting it to the image capturing apparatus 101 so that the user can freely access the recorded image data.

The image capturing apparatus 101 waits until the processed image data is received from the external image processing apparatus 103 in step S510, and when the image data is received, the received image data is recorded in the recording circuit 204 in step S511.

As described above, according to the first embodiment, when image processing using an external image processing apparatus is performed, suitable shooting parameters can be determined by reflecting the characteristics of image processing to be performed in the external image processing apparatus, thereby it is possible to improve the image quality of a captured image. Further, even if the external image processing apparatus is not used or cannot be used, shooting parameters suitable for the characteristics of image processing to be performed in the image processing apparatus can be determined.

In the present embodiment, the case where the NR processing is applied by an external image processing apparatus has been described as an example, but the content of the image processing in the present disclosure is not limited to this. For example, aberration correction may be performed to correct the aberration that occurs in a case where the aperture of the lens is set near the full-open state. In this case, if the aberration is corrected in the external image processing apparatus, the aperture of the lens may be controlled to be changed toward the open side than usual. By doing so, even if the shooting scene is dark, a sufficient amount of light can be received because the aperture is changed toward the open side, and an image with a high resolution can be captured. That is, any image processing may be applied as long as the image processing having different characteristics from those of the image processing performed in the image processing apparatus is applied in the external image processing apparatus.

Further, in the present embodiment, the case of controlling the ISO sensitivity in the Av priority image shooting mode has been described as an example of controlling the shooting parameters, but the method of controlling the shooting parameters in the present disclosure is not limited to this. For example, in an image shooting mode with an ISO sensitivity auto mode, if the upper limit of the ISO sensitivity to be used is set, the shooting parameters may be controlled so as to raise the upper limit.

In the above description, it is explained that, in a case where it is determined that image processing can be used based on the user attributes, the external image processing apparatus 103 determines the change amount of the shooting parameter as shown in FIG. 7 and notifies the change amount to the image capturing apparatus 101, however, the present disclosure is not limited to this. The shooting parameters may be sent from the image capturing apparatus 101 to the external image processing apparatus 103, and if image processing can be used, the external image processing apparatus 103 may change the sent shooting parameters and transmit the changed shooting parameters to the image capturing apparatus 101. Alternatively, only the change amount of the transmitted shooting parameter may be transmitted to the image capturing apparatus 101.

Further, in the present embodiment, it is explained that after an image is captured, obtained RAW image signal is transmitted from the image capturing apparatus 101 to the external image processing apparatus 103, and the RAW image signal undergoes the image processing in the external image processing apparatus 103. However, the timing of applying the image processing to the RAW image signal in the present disclosure is not limited to this. For example, only the transmission of user attribute information regarding the use of the external image processing apparatus 103 and the processing related to updating of the shooting parameters may be performed at the time of image shooting, and the image processing in the external image processing apparatus 103 may be performed after the image shooting. For example, the RAW image recorded on the recording medium in the image capturing apparatus 101 may be transferred onto a user's PC and then transmitted from the user's PC to the external image processing apparatus 103, where image processing is applied.

Further, in the present embodiment, the case where the image capturing apparatus 101 and the external image processing apparatus 103 transmit and receive information via the network 102 has been described as an example, however, transmission and reception between the image capturing apparatus 101 and the external processing apparatus 103 is not limited to this. For example, a configuration in which an edge device such as a smartphone is used as the external image processing apparatus 103, and the image capturing apparatus 101 and the edge device directly communicate with each other via wired or wireless communication may be used.

Further, instead of a RAW image, an image (for example, a JPEG image) after the image processing is applied by the image capturing apparatus 101 may be transmitted to the external image processing apparatus 103. In this case, the external image processing apparatus 103 applies image processing such as NR processing to the transmitted image (for example, a JPEG image).

Further, in the present embodiment, a case where the user attribute determination circuit 302 for determining the user attribute information related to the use of the external image processing apparatus 103 and the external image processing circuit 301 that applies the image processing are configured in the same apparatus is explained as an example. However, the configuration of the external image processing apparatus in the present disclosure is not limited to this. For example, the user attribute determination circuit may be configured to communicate with the image capturing apparatus 101 via a network, and the external image processing circuit 301 may be configured as a software executed on a PC at the user's home.

Further, in the present embodiment, updating of the shooting parameter determined by the external image processing apparatus 103 is automatically applied on the image capturing apparatus 101 and the updated shooting parameters are used for image shooting as an example. However, the control method of shooting parameters is not limited to this. For example, the change amount of the shooting parameter determined by the external image processing apparatus 103 may be notified to the user as a recommended value on the display circuit of the image capturing apparatus 101, and the shooting parameters may be updated depending upon the user's selection. That is, any method of using information on the converted shooting parameters may be used as long as the method is to perform the processing of converting the user attribute information related to the use of the external image processing apparatus 103 to information on the shooting parameters.

Second Embodiment

Next, a second embodiment of the present disclosure will be described. Since the configuration of the image capturing system in the second embodiment is the same as that described with reference to FIGS. 1 to 3, the description thereof will be omitted here.

In the first embodiment described above, a case where the change amounts of the shooting parameter are determined based on the user attribute information regarding the use of the external image processing apparatus 103 has been described. By contrast, in the second embodiment, a case where the shooting parameters are changed based on the shooting information regarding the shooting of an image by the image capturing apparatus 101 will be described.

As in the case described in the first embodiment, even if the NR processing in the external image processing apparatus 103 has a better noise reduction effect, there are cases where the difference in the noise reduction effect performed in the image capturing apparatus 101 and the external image processing apparatus 103 is small depending on a shooting scene and a subject. In such a case, it is necessary to use information on the shooting scene and a captured image in order to appropriately determine the change amounts of the shooting parameters.

Figure 8A:
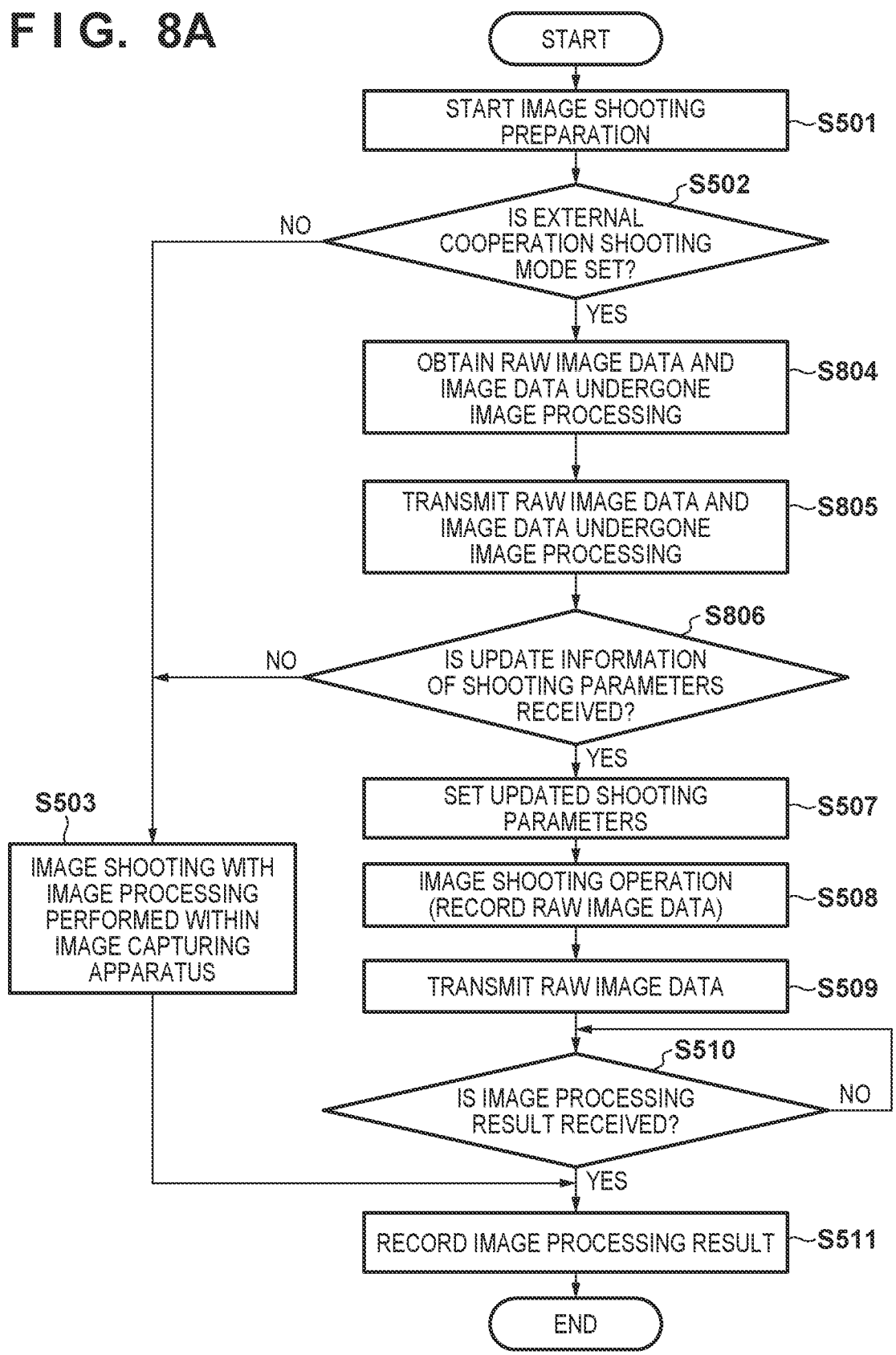
FIG. 8A is a flowchart showing processing of the image capturing apparatus according to a second embodiment.

Next, the image shooting operation in the second embodiment will be described with reference to FIGS. 8A and 8B. FIG. 8A shows the processing in the image capturing apparatus 101, and FIG. 8B shows the processing in the external image processing apparatus 103. Further, in the processes shown in FIGS. 8A and 8B, the same processes as those described in FIGS. 5A and 5B are given the same step numbers, and the description thereof will be omitted as appropriate.

In step S804, the image capturing apparatus 101 captures an image during a preparatory image shooting period, acquires RAW image data, and applies image processing to the acquired RAW image data in the image processing circuit 203 to generate image data.

In step S805, the image capturing apparatus 101 transmits the RAW image data and the image data which has undergone the image processing acquired in step S804 to the external image processing apparatus 103 as shooting information.

In step S820, the external image processing circuit 301 waits for the reception of the shooting information, and when it receives the image information, the process proceeds to step S821 and the external image processing circuit 301 applies NR processing to the received RAW image data.

In step S822, the shooting parameter conversion circuit 303 determines a change amount of the shooting parameter. Specifically, the shooting parameter conversion circuit 303 compares the degrees of noise between the image data undergone the image processing transmitted from the image capturing apparatus 101 and the image data undergone external image processing generated by the external image processing circuit 301 (between image signals). For example, when the difference value between the two images is calculated, the difference value indicates the difference in noise reduction effect between the image capturing apparatus 101 and the external image processing apparatus 103. Therefore, the degrees of noise can be compared by using the amplitude of the signal of the difference value as the noise evaluation value.

Figure 9:
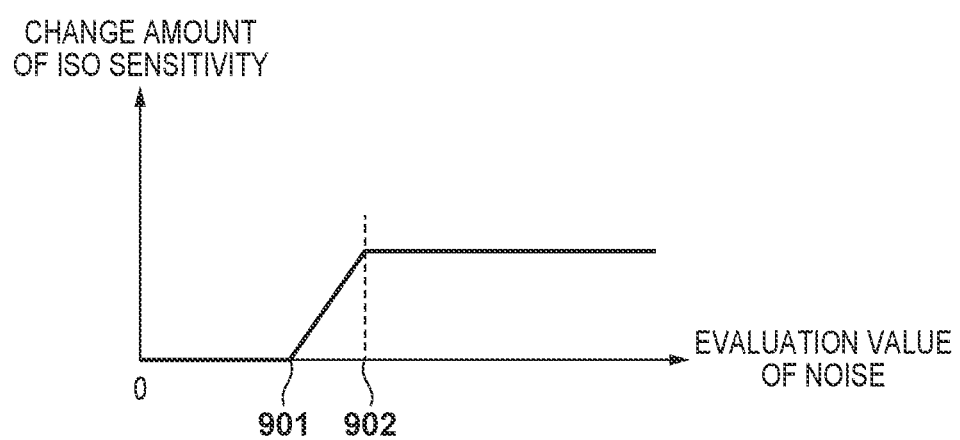
FIG. 9 is a diagram showing an example of change amounts of a shooting parameter according to the second embodiment.

The shooting parameter conversion circuit 303 determines the update content of the shooting parameters based on the calculated noise evaluation value and the characteristics shown in FIG. 9. In FIG. 9, the horizontal axis represents the calculated noise evaluation value, and the vertical axis represents the change amount of the ISO sensitivity by the number of steps. For example, if the calculated noise evaluation value is larger than a value shown by a reference numeral 902 in the figure, the change amount of the ISO sensitivity is determined as one step. In this case, the ISO sensitivity can be increased and the shutter speed can be set faster than in the case of normal image shooting operation, so it is possible to reduce the effects of camera shake and subject blur, thereby it is possible to improve the image quality. On the other hand, if the calculated noise evaluation value is smaller than a value shown by a reference numeral 901 in the figure, it is determined that the ISO sensitivity is not changed.

Then, in step S823, in a case where the change amount of the shooting parameter is determined in step S822, the external image processing circuit 301 transmits the change amount of the shooting parameter to the image capturing apparatus 101. On the contrary, in a case where it is determined not to change the shooting parameter in step S822, the external image processing circuit 301 transmits the notice of not changing the shooting parameter to the image capturing apparatus 101.

In step S806, the image capturing apparatus 101 waits for the information regarding the change amount of the shooting parameter, and when it receives the information regarding the change amount of the shooting parameter, the process proceeds to step S507, and thereafter the image capturing apparatus 101 performs the processes described with reference to FIG. 5. On the other hand, when the image capturing apparatus receives the notice of not changing the shooting parameter, the process proceeds to step S503, and thereafter the image capturing apparatus 101 performs the processes described with reference to FIG. 5.

As described above, according to the second embodiment, it is possible to determine shooting parameters that reflect the characteristics of image processing to be performed in the external image processing apparatus for each shooting scene.

Note that the second embodiment is explained by using a case where the RAW image data obtained during preparatory image shooing and the image data which has undergone the image processing in the image capturing apparatus 101 are transmitted to the external image processing apparatus 103 as shooting information, and are used to determine the change amount of the shooting parameter, as an example. However, the present disclosure does not limit the image data transmitted from the image capturing apparatus 101 to the external image processing apparatus 103 to these. For example, information on the brightness of the shooting scene, information on the type of subject, and information on the characteristics of edges and texture components contained in the subject may be transmitted as the shooting information, and a result of image processing applied by an external image processing apparatus may be estimated based on the shooting information.

Further, in the present embodiment, the case where both the RAW image data and the image processing resultant image to which the image processing by the image capturing apparatus 101 is applied is transmitted has been described, however, only a RAW image signal may be transmitted to the external image processing apparatus, and the external image processing apparatus 103 may apply the same image processing as the image capturing apparatus 101 to the RAW image signal and the resultant image maybe used as the image processing resultant image.

Further, in the present embodiment, the configuration in which the external image processing apparatus 103 determines the change amount of the shooting parameter of the image capturing apparatus 101 has been described as an example, but the present disclosure is not limited to this. For example, when the image capturing apparatus 101 can confirm that the image processing by the external image processing apparatus 103 will be used, the image capturing apparatus 101 may change the shooting parameters according to a predetermined rule. Specifically, when it is confirmed that the image processing by the external image processing apparatus 103 will be used, the image capturing apparatus 101 may perform processing such that the Ev chart is changed to that with the ISO sensitivity being increased by one step, the upper limit of the ISO sensitivity that can be set being increased by one step, and so on. If the NR processing by the external image processing apparatus 103 can be used, the ISO sensitivity of the shooting parameters may be increased, and if the aberration correction processing can be used, the aperture of the shooting parameters may be shifted to the open side. Further, if both the NR processing and the aberration correction processing by the external image processing apparatus 103 can be used, the ISO sensitivity may be increased and the aperture may be shifted to the open side. That is, the shooting parameters may be changed according to the type of image processing used in the external image processing apparatus 103.

Various methods are conceivable as a method for the image capturing apparatus 101 to confirm whether to use the image processing by the external image processing apparatus 103. For example, a method that the image capturing apparatus 101 communicates with the external image processing apparatus 103 to authenticate the user, and a method that causes the user to enter an authentication code obtained from the external image processing apparatus 103 into the image capturing apparatus 101 are conceivable. Alternatively, a configuration to cause the user to select whether to use image processing by an external device on the setting menu of the image capturing apparatus 101 may be used. With such the configuration, since the image capturing apparatus 101 itself changes the shooting parameters, it is not always necessary to provide the shooting parameter conversion circuit 303 in the external image processing apparatus 103.

Further, in the present embodiment, the case where the image capturing apparatus 101 and the external image processing apparatus 103 are separately configured has been described as an example, but the configuration of the image capturing apparatus 101 in the present disclosure is limited to this. For example, an image capturing apparatus 101 may be provided with a plurality of image processing circuits at least some whose processing contents are different from each other. In this case, the shooting parameters are set based on the characteristics of the image processing circuit used during normal image shooting operation, and when another image processing circuit is to be used, the shooting parameters may be updated to the shooting parameters set based on the characteristics of image processing of the image processing circuit to be used. By doing so, even in a case where a plurality of types of image processing with different characteristics are selectively used according to their characteristics, it is possible to determine the shooting parameters depending upon the characteristics of the respective types of image processing.

Further, in the present embodiment, the case where the RAW image data is transmitted to the external image processing apparatus 103 during the preparatory image shooting period when the image shooting operation is started has been described as an example, but the present disclosure does not limit the timing of transmitting the RAW image data to this. For example, the transmission of shooting information and the update of shooting parameters may be performed in a case where it is detected during the preparatory image shooting period that the shooting scene or a subject has changed significantly, or that the shooting parameters to be used change significantly. In addition, the transmission of shooting information and the update of shooting parameters may be performed in a case where ISO sensitivity equal to or higher than a predetermined threshold is set or in a case where it is predicted that desirable image quality cannot be achieved when normal image processing in an image capturing apparatus is applied such as a case where camera shake or motion blur is detected in the captured image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-015534, filed on Jan. 31, 2020 which is hereby incorporated by reference herein in its entirety.

What is claimed is:

1. An image capturing apparatus comprising:
an image sensing unit including an image sensor and configured to capture an image by photoelectric converting an optical image formed on an imaging surface and output an image signal;
a setting unit configured to set shooting parameters to be used at a time of capturing the image by the image sensing unit; and
a communication unit configured to perform transmission and reception of information with an external image processing apparatus,
wherein the communication unit receives information indicating that whether or not it is possible to apply image processing to the image signal in the external image processing apparatus from the external image processing apparatus,
wherein the setting unit sets different shooting parameters to be used at the time of capturing the image by the image sensing unit between in a case where it is possible to apply image processing on the image signal by the external image processing apparatus and in a case where it is not possible to apply image processing on the image signal by the external image processing apparatus, and
wherein the setting unit and the communication unit are implemented by at least one or more processors and/or circuitry.

2. The image capturing apparatus according to claim 1, wherein the shooting parameters include at least one of ISO sensitivity, shutter speed, and an aperture value of a lens.

3. The image capturing apparatus according to claim 1, wherein the communication unit transmits ID information of the image capturing apparatus to the external image processing apparatus,
wherein the external image processing apparatus determines whether or not it is possible to apply the image processing to the image signal in the external image processing apparatus based on the ID information transmitted from the image capturing apparatus.

4. The image capturing apparatus according to claim 1, wherein the setting unit sets the shooting parameters based on information obtained from the external image processing apparatus via the communication unit in a case where it is possible to apply the image processing to the image signal in the external image processing apparatus.

5. The image capturing apparatus according to claim 4, wherein the information obtained from the external image processing apparatus via the communication unit is a change amount of a shooting parameter with respect to the shooting parameter set in a case where it is not possible to apply the image processing to the image signal in the external image processing apparatus.

6. The image capturing apparatus according to claim 4, wherein the communication unit transmits the shooting parameter which is set in a case where it is not possible to apply the image processing to the image signal in the external image processing apparatus to the external image processing apparatus, and receives the shooting parameter which is set in a case where it is possible to apply the image processing to the image signal in the external image processing apparatus from the external image processing apparatus.

7. The image capturing apparatus according to claim 4, wherein the external image processing apparatus determines information for the setting unit to set the shooting parameter based on a difference between the image signal undergone the image processing and the image signal not undergone the image processing.

8. The image capturing apparatus according to claim 7, further comprising an image processing unit configured to perform image processing using different algorithm from that of the image processing in the external image processing apparatus,
wherein the image processing unit is implemented by at least the one or more processors.

9. An image capturing apparatus comprising:
an image sensing unit including an image sensor and configured to capture an image by photoelectric converting an optical image formed on an imaging surface and output an image signal; and
a setting unit configured to set shooting parameters to be used at a time of capturing the image by the image sensing unit,
wherein the setting unit determines whether or not it is possible to apply the image processing to the image signal in an external image processing apparatus according to user input,
wherein the setting unit sets different shooting parameters to be used at the time of capturing the image by the image sensing unit between in a case where it is possible to apply image processing on the image signal by the external image processing apparatus and in a case where it is not possible to apply image processing on the image signal by the external image processing apparatus, and
wherein the setting unit is implemented by at least one or more processors and/or circuitry.

10. The image capturing apparatus according to claim 9, wherein the setting unit determines that it is possible to apply the image processing to the image signal in the external image processing apparatus in a case where an authentication code for performing the image processing in the external image processing apparatus is input.

11. A control method of an image capturing apparatus, the control method comprising:
capturing an image by photoelectric converting an optical image formed on an imaging surface and outputting an image signal;
setting shooting parameters to be used at a time of capturing the image; and
performing transmission and reception of information with an external image processing apparatus,
wherein information indicating that whether or not it is possible to apply image processing to the image signal in the external image processing apparatus is received from the external image processing apparatus, and
wherein different shooting parameters to be used at the time of capturing the image are set between in a case where it is possible to apply image processing on the image signal by the external image processing apparatus and in a case where it is not possible to apply image processing on the image signal by the external image processing apparatus.

12. A non-transitory computer-readable storage medium storing a program that is executable by a computer, wherein the program includes program code for causing the computer to perform a control method of an image capturing apparatus, the control method comprising:
capturing an image by photoelectric converting an optical image formed on an imaging surface and outputting an image signal;

setting shooting parameters to be used at a time of capturing the image; and performing transmission and reception of information with an external image processing apparatus, wherein information indicating that whether or not it is possible to apply image processing to the image signal in the external image processing apparatus is received from the external image processing apparatus, and wherein different shooting parameters to be used at the time of capturing the image are set between in a case where it is possible to apply image processing on the image signal by the external image processing apparatus and in a case where it is not possible to apply image processing on the image signal by the external image processing apparatus.

* * * * *